May 18, 1943.     G. HEPP     2,319,320
CIRCUIT ARRANGEMENT
Filed Jan. 16, 1941     2 Sheets-Sheet 1

INVENTOR
G. Hepp
BY
ATTORNEY

Patented May 18, 1943

2,319,320

UNITED STATES PATENT OFFICE 2,319,320

CIRCUIT ARRANGEMENT

Gerard Hepp, Eindhoven, Netherlands; vested in the Alien Property Custodian

Application January 16, 1941, Serial No. 374,783
In the Netherlands September 14, 1939

5 Claims. (Cl. 250—27)

This invention relates to a circuit-arrangement for the supply of electric oscillations to a load, comprising an electrical apparatus having one or more discharge tubes connected in the transmission circuit. The electrical apparatus may be constituted, for example, by an oscillator generator having a discharge tube, such as for example the carrier-wave generator in a carrier-wave telephony system, from which the various carrier-waves required are derived, for example, by means of frequency multiplication. In order to avoid that in the case of a disturbance in this carrier-wave generator the operation continues uninterruptedly a spare carrier-wave generator is provided which then becomes operative.

The electrical apparatus may alternatively be an amplifier which must be in constant operation and which is replaced by a spare amplifier when a disturbance occurs, for example if one of the amplifying tubes becomes defective.

According to the invention, in circuit-arrangements for the supply of electric oscillations to a load, in which the transmission circuit includes an electrical apparatus having one or more discharge tubes, and automatic change-over from the normal to the spare apparatus is obtained by that an alternating voltage derived from the apparatus is rectified and this rectified voltage blocks one or more discharge tubes of the spare apparatus, said blocking being suppressed if the effective output energy of the normal apparatus falls below a definite value.

The invention will be more clearly understood by reference to the accompanying drawings forming part of the specification and in which.

Figure 1:
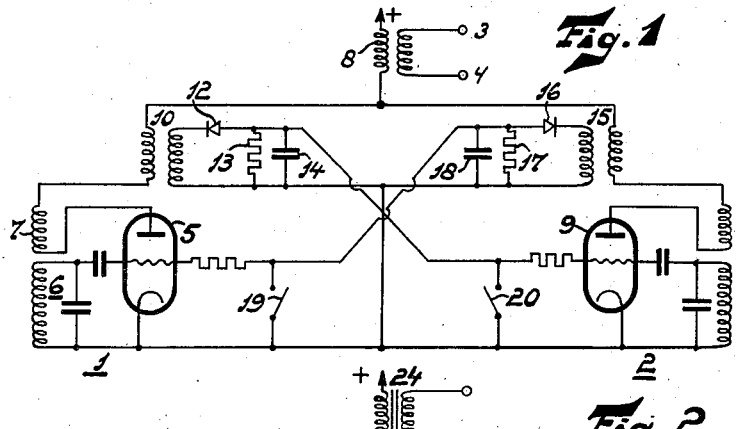
Figure 1 illustrates a circuit arrangement in accordance with the invention as applied to oscillation generators.

Fig. 1 of the drawings shows a circuit-arrangement comprising an oscillator generator 1 whose effective output energy is supplied to a circuit connected to output terminals 3, 4. The oscillator generator is constituted by a back coupled discharge tube 5 comprising an oscillator circuit 6 in the grid circuit, which is tuned to the frequency of the oscillations to be generated, and a feed-back coil 7 in the anode circuit. The anode circuit includes the primary winding of a transformer 8 whose secondary winding is connected to the output terminals 3, 4.

If, for example due to normal wear or due to the discharge tube 5 becoming defective, the effective energy supplied by the generator 1 to the output terminals 3, 4 falls below a definite value, or if this supply of energy completely discontinues, a spare oscillator generator 2 becomes automatically operative which has a discharge tube 9 which is connected in a similar manner as tube 5 of the oscillator generator 1.

As long as the generator 1 is in normal operation, the generator 2 is blocked by a direct voltage applied to the grid of the discharge tube 9 so that no oscillations are generated by the latter. This direct voltage is obtained by rectifying, by means of a rectifier 12, the alternating voltage set up across the secondary winding of a transformer connected in the anode circuit of the operative discharge tube 5. The rectified voltage which is produced across a resistance 13 shunted by a condenser 14 is supplied to the grid of tube 9. The circuit elements are so dimensioned that in normal operation of the generator 1 tube 9 is blocked.

If, now, the generator 1 becomes inactive due to some disturbance or other, then the alternating voltage across the secondary winding of the transformer 10 disappears and hence the rectified voltage aross the resistance 13. In this case the blocking of tube 9 is suppressed and the oscillatory generator 2 now becomes operative and supplies energy to the output terminals 3, 4.

In order to avoid that in the case of a disturbance of short duration the generator 1 would become operative again the latter is blocked by the generator 2. To this end, the alternating voltage across the secondary winding of a transformer 15 included in the anode circuit of tube 9 is rectified by means of a rectifier 16 and the rectified voltage produced across a resistance 17 and a condenser 18 connected in parallel thereto is supplied to the grid of discharge tube 5 so that the latter is blocked.

In order to be able to make one of the generators operative or inoperative, as may be desired, switches 19 and 20 are provided in the grid circuits of the tubes 5 and 9. If it is desired, for example, to switch over to the generator 2 when generator 1 is in operation, switch 20 is closed for a short time with the result that the blocking of tube 9 is suppressed and the direct voltage set up across the resistance 17 by rectification of the oscillations now generated by generator 2 makes the generator 1 inoperative.

Figure 2:
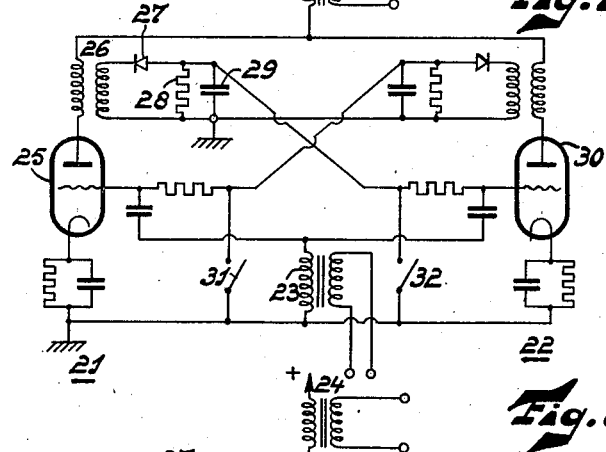
Fig. 2 illustrates the invention as applied to amplifiers.

Fig. 2 of the drawing shows a circuit-arrangement according to the invention, in which the electrical apparatus in the transmission circuit is an amplifier 21 which is automatically replaced by a spare amplifier 22, if the effective output energy of the former falls below a definite value.

The oscillations to be amplified in this circuit-arrangement are supplied to an input transformer 23 and the amplified oscillations are derived from an output transformer 24. When the amplifier 21 is operative, in the presence of a voltage to be amplified an alternating voltage is produced across the secondary winding of a transformer 26 connected in the anode circuit of the amplifying tube 25. This alternating voltage is rectified by a rectifier 27 and the rectified voltage produced across a resistance 28 and a condenser 29 connected in parallel thereto is supplied to the grid of the amplifying tube 30 of the amplifier 22 with the result that the latter is blocked. This blocking disappears if a disturbance in the amplifier 21 occurs so that then the amplifier 22 becomes automatically operative. The latter is connected in exactly the same manner as the amplifier 21, so that a more detailed description is considered superfluous.

In this circuit-arrangement also switches 31 and 32 may be included in the grid circuits of the tubes 25 and 30 so that in the same manner as in the circuit of Fig. 1 the operation may be switched over at will from the one to the other amplifier.

In the circuit-arrangement of Fig. 2 amplifiers 21 and 22 have a common input circuit. This is, however, not essential so that each amplifier may alternatively have a separate input circuit which is fed by an independent source of oscillations to be amplified. If, for example, the amplifier serves for the amplification of the carrier-wave oscillation generated by a carrier-wave generator in a multiplex telephony system, each of the input circuits may have a carrier-wave generator connected to it.

The circuit is particularly adapted for the amplification of oscillations of constant amplitude. For the amplification of music or speech it cannot be used without additional means, since in the intervals between the words or in the case of very weak passages in the music the blocking of the one amplifier by the other fails. For amplifying oscillations as speech or music a control frequency should therefore be added to the oscillations to be amplified, which control frequency is always present.

Figure 3:
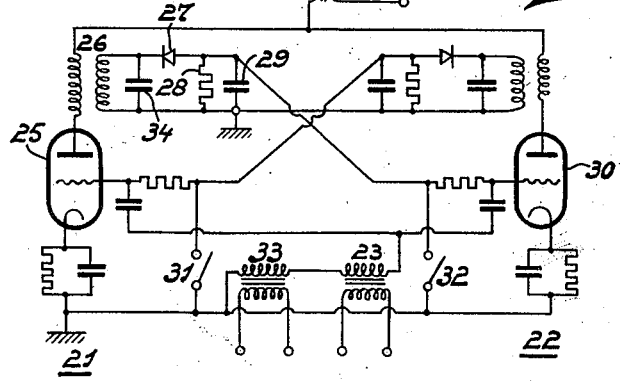
Fig. 3 illustrates a modification of the invention as embodied in Fig. 2.

Fig. 3 shows a circuit-arrangement of this kind. It mainly corresponds to the circuit of Fig. 2, so that the same reference figures for corresponding circuit elements are used. The input circuit, however, comprises, in addition to the transformer 23 which has supplied to it the oscillations to be amplified, a transformer 33 which has supplied to it a control oscillation having a frequency which is located outside the frequency range of the oscillations to be amplified. The transformer 26 in the anode circuit of tube 25 and the corresponding transformer in the anode circuit of tube 30 are each tuned by means of condensers connected in parallel to the respective secondary windings. The tuning condenser for the transformer 26 is indicated by 34. The rectified voltage set up across the resistance 28 is therefore solely dependent on the control frequency and only if the latter is present with sufficiently large amplitude in the anode circuit of tube 25 the other amplifier 30 is blocked. Furthermore, if in the anode circuit of tube 25 there should arise a hum voltage or a parasitic oscillation brought about by improper operation of the amplifier, it cannot occur that the amplifier 21 remains operative, which would be the case in the circuits of Figs. 1 and 2. For this reason in the circuits of Figs. 1 and 2 it might also be desirable that a filter or a tuned circuit selective to one or more alternating-current components of the effective output energy should be connected in series with the rectifiers supplying the direct voltage serving for the blocking action.

If in the above-described circuit-arrangements of Figs. 2 and 3 short-circuiting of the anode circuit of the operative amplifier occurs, the second amplifier will be set in operation, but since the two amplifiers have a common output circuit the anode circuit of the second amplifier also will be short-circuited so that no energy will be delivered to the load connected to the output circuit.

Figure 4:
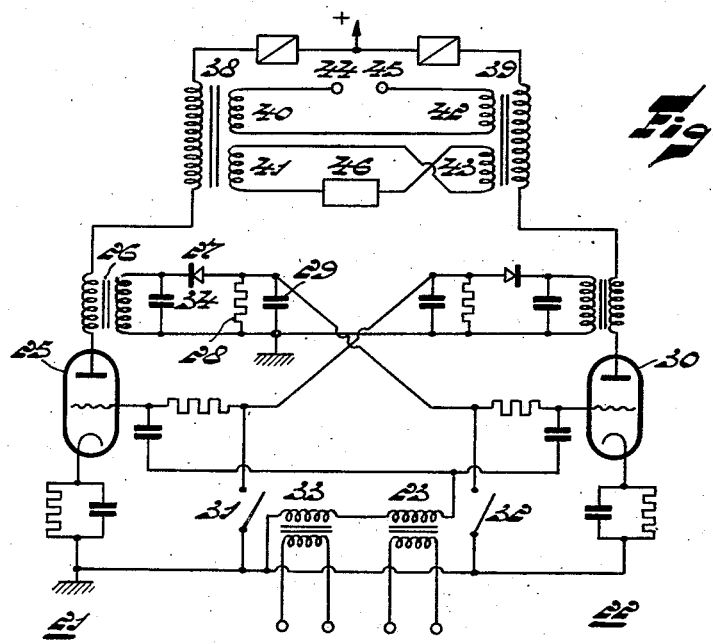
Fig. 4 illustrates a modification of the circuits of Figs. 2 and 3 in which the anode circuits of the amplifier tubes are isolated from each other.

Fig. 4 shows a circuit-arrangement similar to the circuit of Fig. 3, in which the anode circuits of the amplifying tubes 25 and 30, are, however, so related to the output circuit that short-circuiting of the anode circuit of the one does not affect the supply of energy by the other amplifier.

To this end the respective anode circuits of the tubes 25 and 30 include transformers 38 and 39 which are each provided with two secondary windings 40, 41 and 42, 43 respectively. The windings 40 and 42 are connected to each other through output terminals 44 and 45, between which is connected the load, and the windings 41 and 43 are connected to one another through an impedance 46 which is equivalent to the impedance of the load. Therefore equally great currents will always flow in the circuits 40, 44, 45, 42 and 41, 43, 46 when one of the amplifiers 21 or 22 is operative. The secondary windings are now so connected that voltages which are equally high, but oppositely directed, are induced by these currents in the primary winding so that no voltage occurs across the primary winding of the transformer 39 when the amplifier 21 is operative. Similarly no voltage is set up across the primary winding of the transformer 38 when the amplifier 22 is operative. In the case of short-circuiting of the anode circuit of the operative amplifier, for example 21, the amplifier 22 will now automatically be switched-in and, since the latter generates no voltage across the primary winding of the transformer 38, the short-circuit does not influence the energy delivered to the load connected between the output terminals 44 and 45.

It will be clear that the connection for a balanced relationship of both anode circuits just described, may also be used in other, not amplifying circuits, for example in the circuit of Fig. 1.

Figure 5:
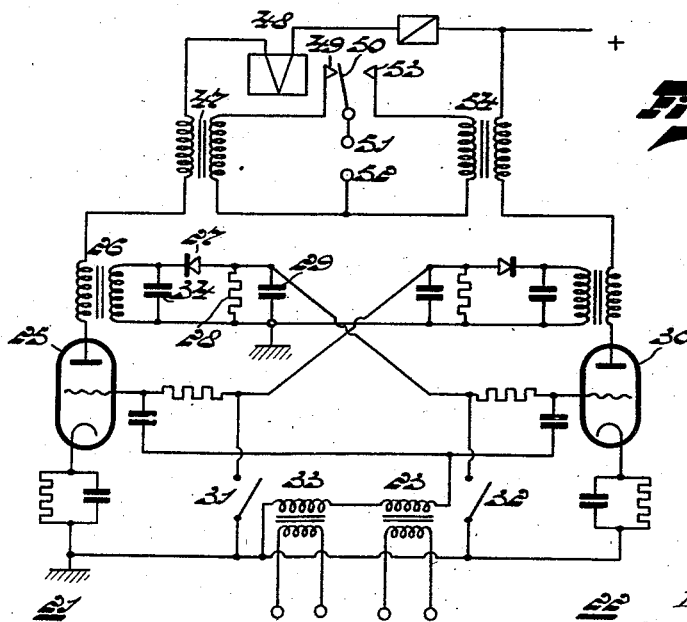
Fig. 5 illustrates another method of isolating the anode circuits of the respective tubes.

Another circuit-arrangement giving a similar result is shown in Fig. 5 which, for the sake of simplicity, is used again in an amplifying circuit of Fig. 3. In the anode circuit of the amplifying tube 25, which is normally in operation, a relay 48 is connected in series with the primary winding of a transformer. The relay is energised by the anode direct-current of the tube 25 so that the relay contact 49, 50 is closed and the secondary winding of the transformer 47 is connected to the output terminals 51, 52. In the case of short-circuiting of the anode circuit of the tube 25 the blocking of tube 30 is suppressed and tube 25 is blocked. Then anode current does not flow any longer in the tube 25 so that the relay 48 is released and the relay contacts 50, 53 are closed and the secondary winding of a transformer 54, which is connected in the anode circuit of the tube 30, is connected to the output terminals 51, 52. Tube 30, then supplies energy to the load connected with these output terminals.

What I claim is:

1. A circuit arrangement comprising a transmission path for delivering power to a load and comprising a discharge tube having an anode coupled to said load, a cathode and a control electrode, a second transmission path for delivering power to said load and comprising a discharge tube having an anode coupled to said load, a cathode and a control electrode, means to render said second path inoperative during operation of the first path, said means comprising a rectifier coupled to the anode of the discharge tube of said first path, said rectifier being connected to the control electrode of the discharge tube of the second path and applying a blocking potential thereto during operation of the first path.

2. A circuit arrangement comprising a transmission path for delivering power to a load and comprising a discharge tube having an anode coupled to said load, a cathode and a control electrode, a second transmission path for delivering power to said load and comprising a discharge tube having an anode coupled to said load, a cathode and a control electrode, means to selectively place in service one of the transmission paths to the exclusion of the other, said means comprising a plurality of rectifiers one in each of said transmission paths and coupled to the corresponding anode, the rectifier coupled to said first path being connected to the control electrode of the discharge tube of said second path and applying a blocking potential thereto during operation of the first path, and the rectifier coupled to said second path being connected to the control electrode of the discharge tube of said first path and applying a blocking potential thereto during operation of said second path.

3. A circuit arrangement comprising a transmission path for delivering power to a load and comprising a discharge tube having a cathode, a control electrode, and an anode and a coupling circuit interposed between said anode and their load, a second transmission path for delivering power to said load and comprising a discharge tube having a cathode, a control electrode, and an anode and a coupling circuit interposed between said anode and the load, means to selectively place in service one of the transmission paths to the exclusion of the other, said means comprising a plurality of rectifiers one associated with each of said coupling circuits, the rectifier associated with said first path being connected to the control electrode of the discharge tube of the second path and applying a blocking potential thereto during operation of the first path, and the rectifier associated with the second path being connected to the control electrode of the discharge tube of the first path and applying a blocking potential thereto during operation of said second path, a signal source of a control frequency connected to said transmission paths, said coupling circuits being tuned to said control frequency.

4. A circuit arrangement comprising a transmission path for delivering power to a load and comprising a discharge tube having a cathode, a control electrode and an anode, a second transmission path for delivering power to said load and comprising a discharge tube having a cathode, a control electrode and an anode, means to render said second path inoperative during operation of the first path, said means comprising a rectifier coupled to the anode of the discharge tube of said first path, said rectifier being connected to the control electrode of the discharge tube of the second path and applying a blocking potential thereto during operation of the first path, and means to connect the anodes in balanced relationship whereby defects in one transmission path do not influence the power delivered to the load by the other transmission path, said means comprising coupling transformers in each path and having primary, secondary and tertiary windings, the primary windings being connected to the respective anodes, the secondary windings being connected in series with each other and with the load and the tertiary windings being connected in series with an impedance equivalent to the impedance of the load and in voltage opposition with each other.

5. A circuit arrangement comprising a transmission path for delivering power to a load and comprising a discharge tube having a cathode, a control electrode and an anode, and a load coupling device, a second transmission path for delivering power to said load and comprising a discharge tube having a cathode, a control electrode and an anode, and a load coupling device, means to selectively place in service one of said transmission paths to the exclusion of the other, said means comprising a plurality of rectifiers one in each of said transmission paths and coupled to the corresponding anode, the rectifier coupled to said first path being connected to the control electrode of the discharge tube of said second path and applying a blocking potential thereto during operation of the first path, and the rectifier coupled to said second path being connected to the control electrode of the discharge tube of the first path and applying a blocking potential thereto during operation of said second path, and a relay member adapted to alternately transfer the respective load coupling devices to the load in synchronism with the transfer of the transmission paths.

GERARD HEPP.